United States Patent
Wilson (10) Patent No.: US 9,663,183 B1
(45) Date of Patent: May 30, 2017

(54) TOWING FRAME FOR A BICYCLE

(71) Applicant: Jon N. Wilson, Ogdensburg, NY (US)

(72) Inventor: Jon N. Wilson, Ogdensburg, NY (US)

(*) Notice: Subject to any disclaimer, the term of this patent is extended or adjusted under 35 U.S.C. 154(b) by 0 days.

(21) Appl. No.: 14/972,531

(22) Filed: Dec. 17, 2015

Related U.S. Application Data (60) Provisional application No. 62/093,109, filed on Dec. 17, 2014.

(51) Int. Cl.
*B62K 27/12* (2006.01)
*B62K 27/00* (2006.01)
*B60D 1/00* (2006.01)

(52) U.S. Cl.
CPC ............ *B62K 27/12* (2013.01); *B62K 27/00* (2013.01); *B60D 2001/003* (2013.01)

(58) Field of Classification Search
CPC ... B62K 27/00; B62K 27/12; B60D 2001/003
USPC ........................................................ 280/204
See application file for complete search history.

(56) References Cited

U.S. PATENT DOCUMENTS

| | | | | |
|---|---|---|---|---|
| 660,598 A | * | 10/1900 | Stonebridge | B62K 27/12 280/204 |
| 704,871 A | * | 7/1902 | Davis | B62K 27/12 280/292 |
| 2,283,716 A | * | 5/1942 | Zalimeni | B62K 27/14 280/204 |
| 2,394,277 A | * | 2/1946 | Viner | B62K 27/00 280/204 |
| 3,843,164 A | * | 10/1974 | Flegel | B60D 1/00 280/204 |
| 3,848,890 A | * | 11/1974 | MacAlpine | B62K 27/12 280/204 |
| 3,993,321 A | * | 11/1976 | Cote | B62J 99/00 280/204 |
| 4,174,120 A | * | 11/1979 | Freeman | B62K 27/12 280/204 |
| 4,261,592 A | * | 4/1981 | Busseuil | B62K 27/003 280/292 |
| 4,325,564 A | * | 4/1982 | Phipps | B62K 27/006 280/204 |
| 4,736,963 A | | 4/1988 | Bettencourt | |
| 5,011,170 A | * | 4/1991 | Forbes | B60D 1/00 280/204 |
| 5,039,120 A | * | 8/1991 | Stowe | B60D 1/00 280/204 |
| 5,350,184 A | | 9/1994 | Hull et al. | |
| 5,454,578 A | * | 10/1995 | Neack | B62K 13/06 280/204 |
| 6,050,580 A | | 4/2000 | Pawelek | |
| 6,290,247 B1 | * | 9/2001 | Schafer | B62K 27/12 280/292 |
| 6,554,307 B1 | | 4/2003 | Ockenden | |
| 6,561,533 B2 | | 5/2003 | Snobl | |

(Continued)

*Primary Examiner* — Kevin Hurley
*Assistant Examiner* — Michael Stabley
(74) *Attorney, Agent, or Firm* — Robert C. Montgomery; Montgomery Patent & Design, LP.

(57) ABSTRACT

A towing frame for a bicycle includes a tow bar suitable for use with a two-wheeled style bicycle. The towing frame includes a "U"-shaped tow bar with mounting apertures and hardware for connection to a rear frame portions of the bicycle and a rear bracket for attachment of a towed vehicle such as a cart or wagon.

3 Claims, 8 Drawing Sheets

(56) References Cited

U.S. PATENT DOCUMENTS

| | | | | |
|---|---|---|---|---|
| 6,662,679 | B2 * | 12/2003 | Hobdy | B60D 1/00 |
| | | | | 74/548 |
| 6,983,947 | B2 | 1/2006 | Asbury et al. | |
| 7,568,718 | B1 * | 8/2009 | Thomas | B60D 1/52 |
| | | | | 280/505 |
| 8,091,908 | B2 | 1/2012 | Wilson et al. | |
| 8,814,193 | B2 * | 8/2014 | Barnes | B62K 27/12 |
| | | | | 280/204 |
| 9,321,503 | B2 * | 4/2016 | Fix | B62K 27/003 |
| 2002/0096857 | A1 | 7/2002 | Valdez et al. | |
| 2012/0313345 | A1 * | 12/2012 | Kamler | B62K 27/003 |
| | | | | 280/292 |

* cited by examiner

TOWING FRAME FOR A BICYCLE

RELATED APPLICATIONS

The present invention is a continuation of, was first described in, and claims the benefit of U.S. Provisional Application No. 62/093,109, filed Dec. 17, 2014, the entire disclosures of which are incorporated herein by reference.

FIELD OF THE INVENTION

The present invention relates generally to a towing frame suitable for use with a bicycle.

BACKGROUND OF THE INVENTION

Modern concerns over health and physical fitness have produced an abundance of people who religiously participate in a variety of exercise regimens in order to stay in shape. One (1) of the most popular exercise activities involves bicycle riding. However, with the typical bicycle being a single-rider machine, problems and logistical difficulties quickly arise when using a bike to assist in transporting equipment.

Utilizing bicycle baskets typically located on the handlebars greatly diminishes the amount one can transport, plus oversized items can easily make the bicycle unwieldy or even unsafe. Oversized items are more easily held in a larger portable device like a yard cart. It is inherently much safer to tow such a yard cart or other similar wheeled item behind the bicycle. Accordingly, there exists a need for a means by which a single-rider bicycle can easily transport such a wheeled via a towing frame.

SUMMARY OF THE INVENTION

The inventor has recognized the aforementioned lack in the art and observed that there is a need for a towing frame suitable for use with a bicycle.

It is therefore an object of the invention to provide a towing structure, which consists of a frame having a first side rail, a second side rail and a horizontal rail connecting the first ends of the first and second rails. The towing structure also consists of a hitch bracket which may be affixed to and extend outward from a center point of the horizontal rail. The hitch bracket consists of a first hitch leg and a second hitch leg. The second hitch leg is disposed parallel to the first hitch leg. The hitch bracket may also extend in an opposite direction than the first and second side rails.

The towing structure may be capable of being removable attached to a bicycle. In this embodiment, the first and second side rails may further comprise a plurality of first and second apertures respectively disposed in parallel with each other and capable of receiving a fastener to attach the towing structure to the bicycle. The horizontal rail may provide a gap between the first and second rails, the gap of which is configured to provide clearance of a wheel of the bicycle.

The hitch bracket may also be configured so that the first hitch leg has a first hitch aperture and the second hitch leg which has a second hitch aperture. In this configuration, the first and second hitch apertures are aligned with each other to receive a hitch pin. The hitch pin is configured to removably attach to a towed structure. The hitch pin may also have a retainer.

The plurality of first apertures may also be aligned with the first bracket aperture and be capable of receiving a fastener to adaptably attach the towing structure to a first side of a bicycle. With this configuration in view, the plurality of second apertures is also aligned with the second bracket aperture, and are likewise capable of receiving the fastener to adaptably attach the towing structure to a second side of a bicycle. The first and second hitch apertures may also be vertically-aligned with each other to receive a hitch pin so that the towing structure is removably attachable to a towed structure.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 towing frame
20 frame
22a first side rail
22b second side rail
22c horizontal rail
30a first hub mounting aperture
30b second hub mounting aperture
40a first bracket
40b second bracket
41a first bracket fastener aperture
41b second bracket fastener aperture
42a first bracket mount aperture
42b second bracket mount aperture
50 hitch bracket
51a first leg
51b second leg
52a first hitch pin aperture
52b second hitch pin aperture
80 hitch pin
81 retainer
82 bolt fastener
84 nut fastener
100 bicycle
105 upper rear frame
106 lower rear frame
107 hub plate
110 rear wheel/tire 150 towed vehicle
155 tongue

DETAILED DESCRIPTION OF THE PREFERRED EMBODIMENT

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Figure 1:
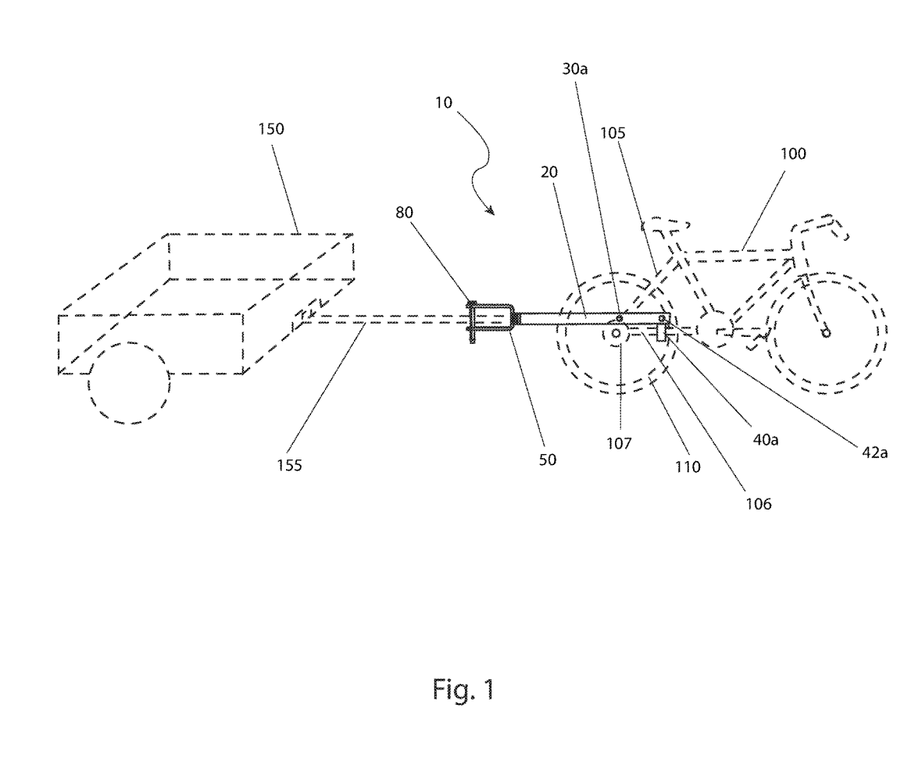
FIG. 1 is an environmental view of a towing frame for a bicycle 10 depicting attachment to a bicycle 100 and a towed vehicle 150, according to a preferred embodiment of the present invention.

Referring now to FIG. 1, an environmental view of a towing frame for a bicycle (herein described as the "apparatus") 10, which provides a tow bar suitable for use with an existing two-wheel bicycle 100 for the purpose of towing a vehicle 150 such as a cart, wagon, or the like. The apparatus 10 includes a "U"-shaped towing frame 20 which straddles a rear wheel/tire 110 portion of the towing bicycle 100, being fastened to lower rear frame 106 and hub plate 107 portions of the bicycle 100. The frame 20 includes a plurality of apertures 30a, 30b, 42a, 42b located at a forward end portion which work in conjunction with a first bracket 40a and a second mounting bracket 40b for connection of the apparatus 10 to the towing bicycle 100. The tow frame 20 further includes a hitch bracket 50 located along a rear portion, which enables attachment of an existing towed vehicle 150 such as a cart or a wagon in a removable manner using a standard hitch pin 80 with a retainer 81, or equivalent fastening means.

It is understood that installation of the apparatus 10 upon the bicycle 100 does not interfere with the normal operation of the bicycle 100.

Figure 2:
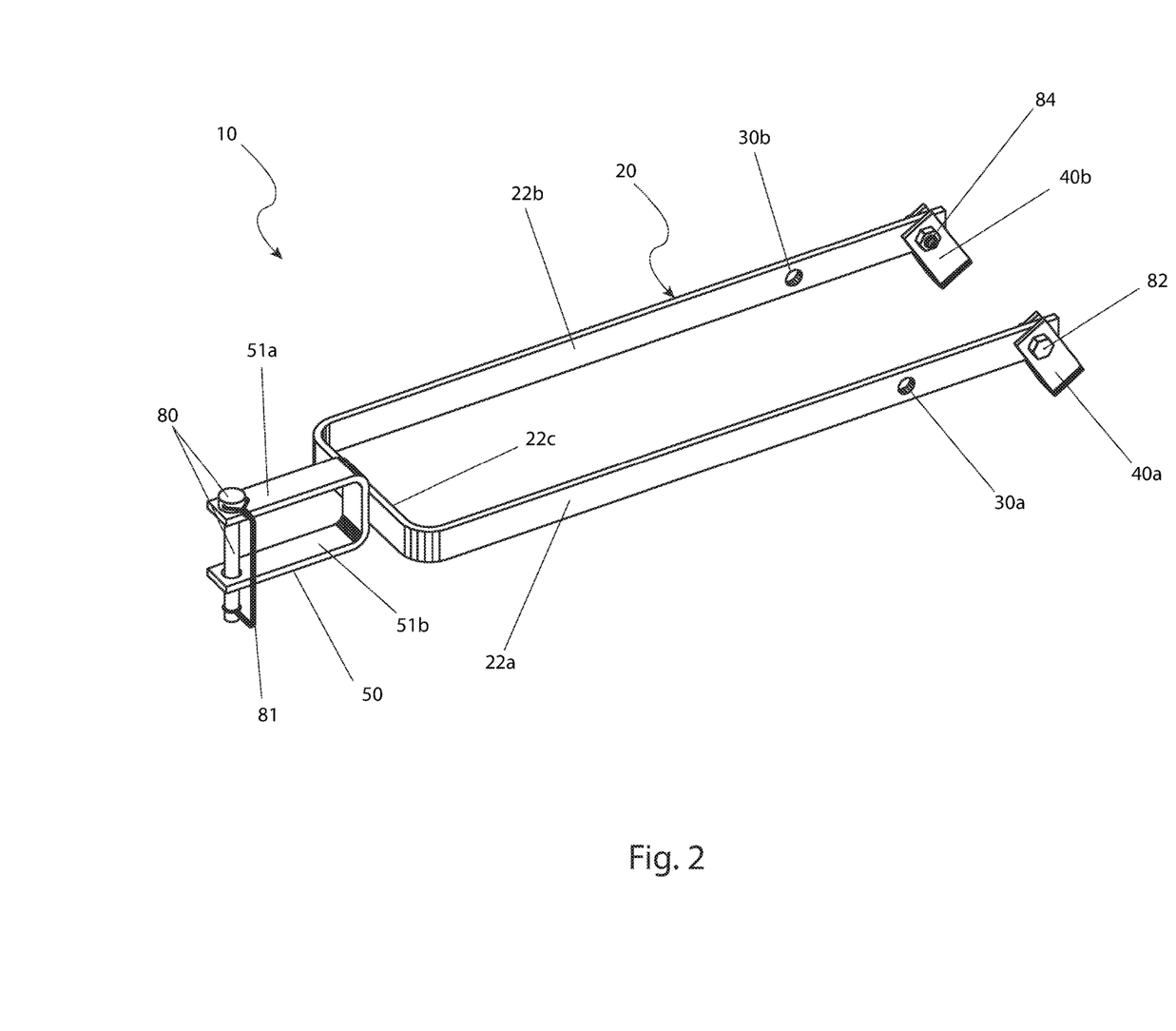
FIG. 2 is a perspective view of the towing frame 10, according to a preferred embodiment of the present invention.
Figure 3:
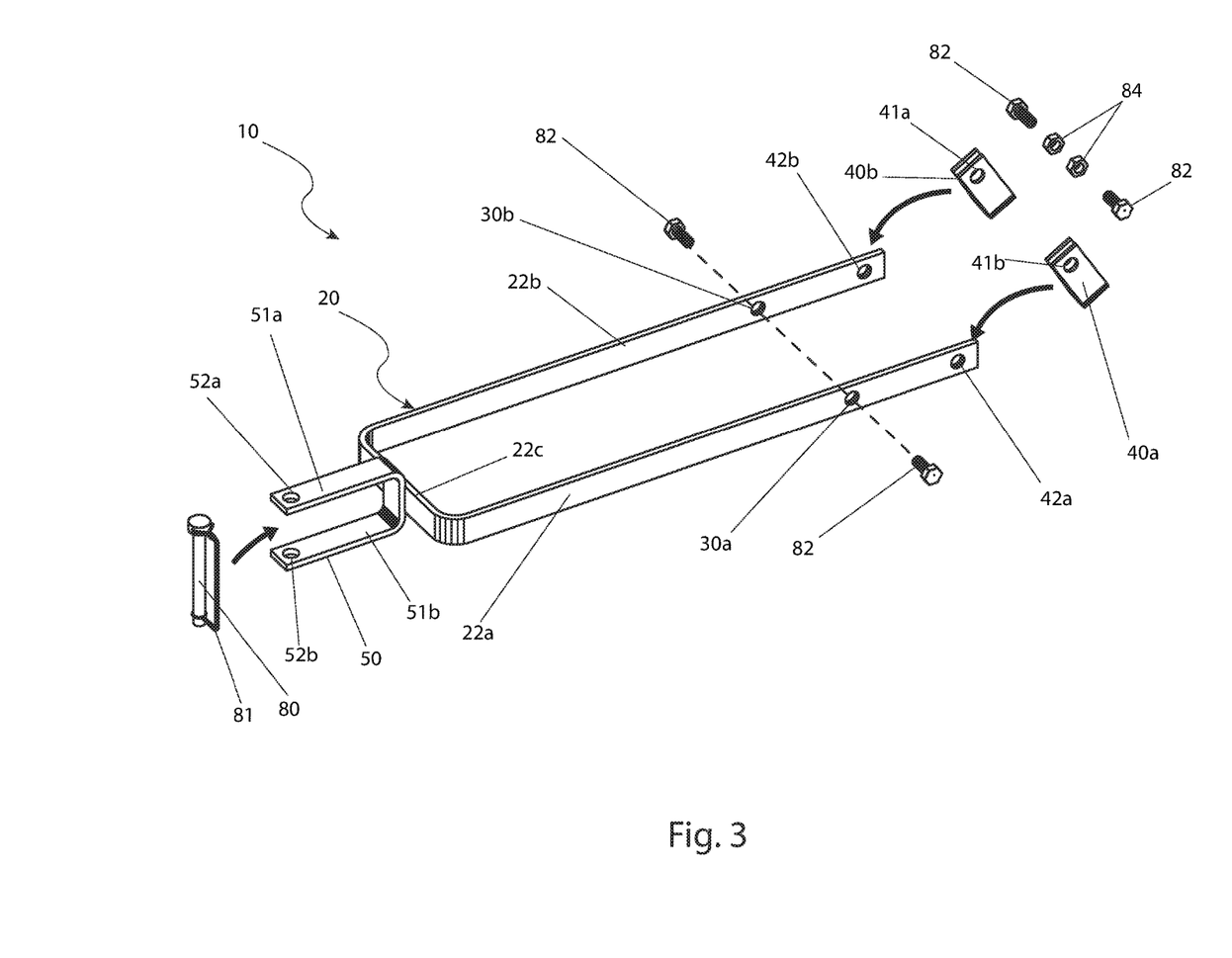
FIG. 3 is an exploded view of the towing frame 10, according to a preferred embodiment of the present invention.
Figure 4:
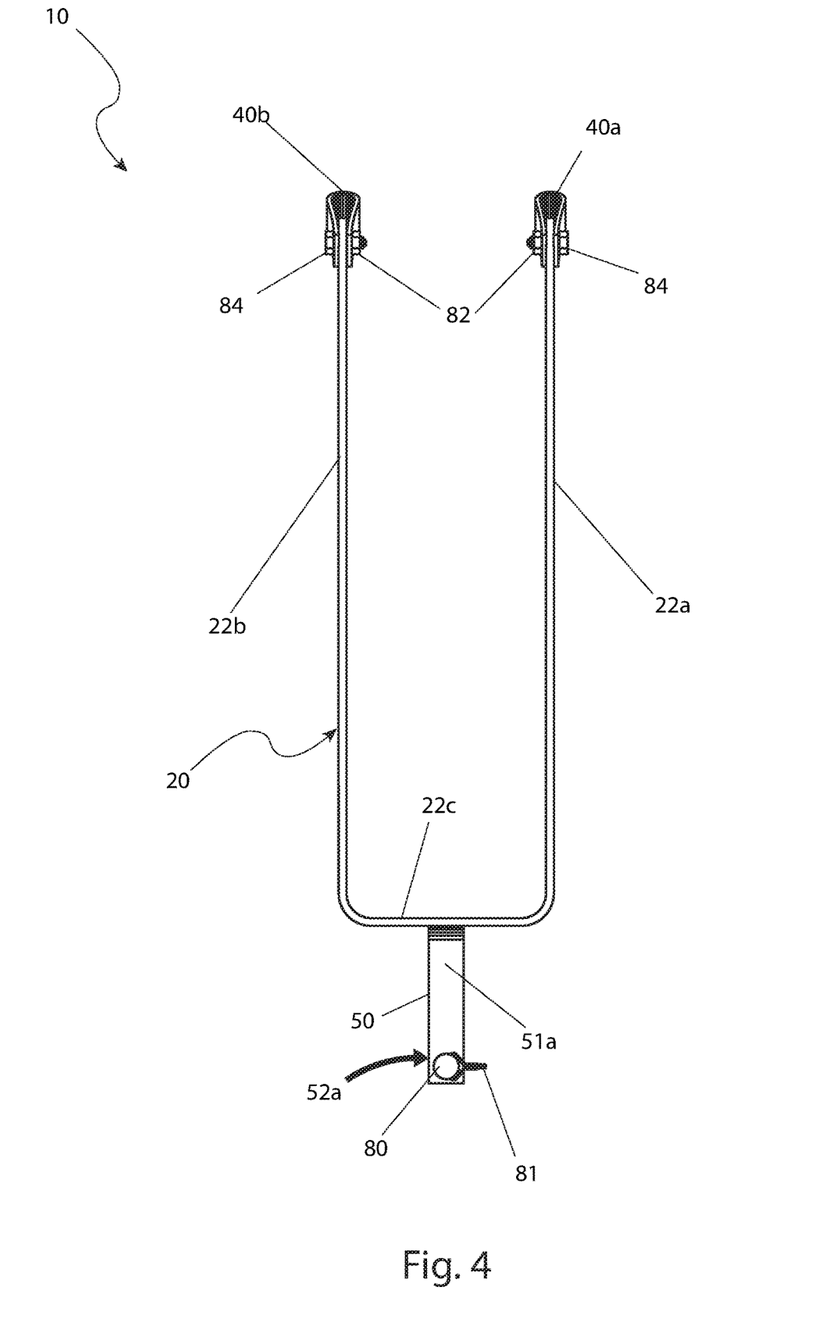
FIG. 4 is a top view of the towing frame 10, according to a preferred embodiment of the present invention.
Figure 5:
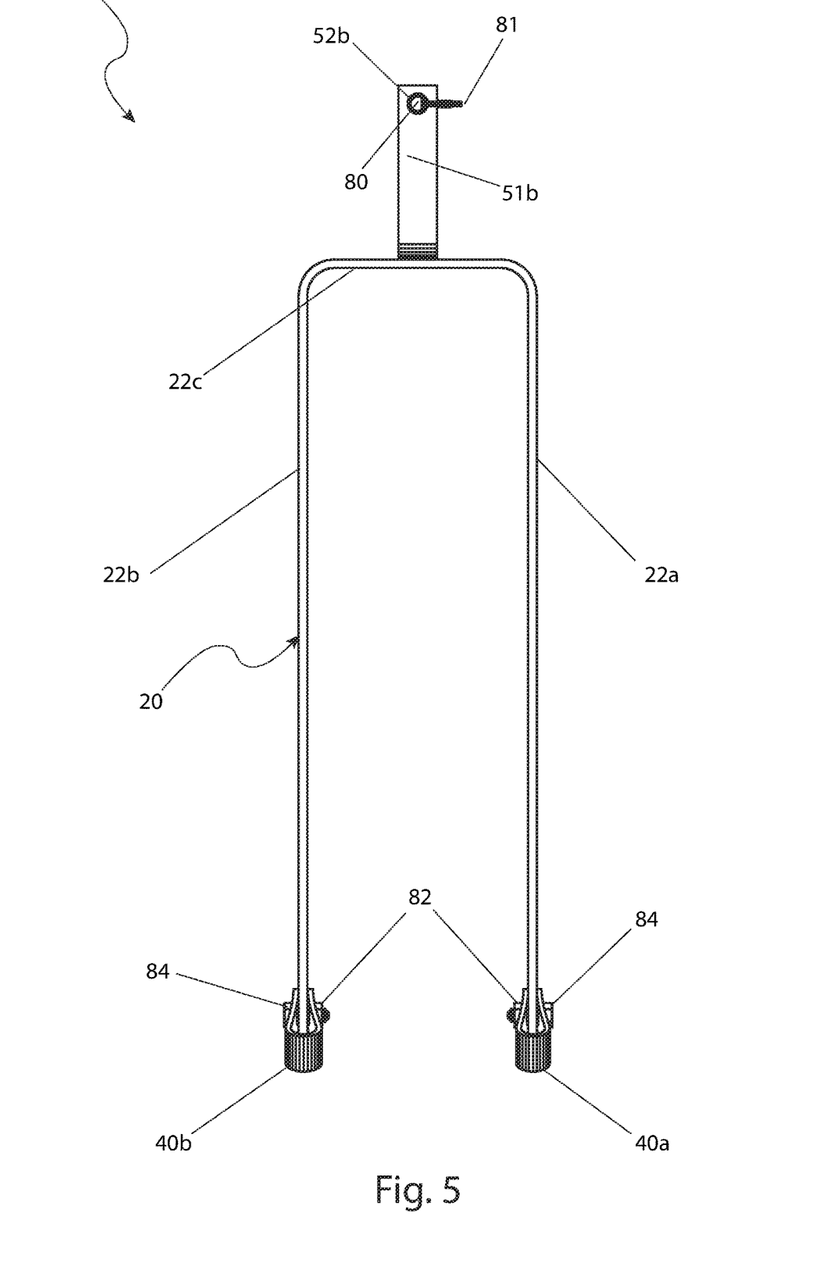
FIG. 5 is a bottom view of the towing frame 10, according to a preferred embodiment of the present invention.
Figure 6:
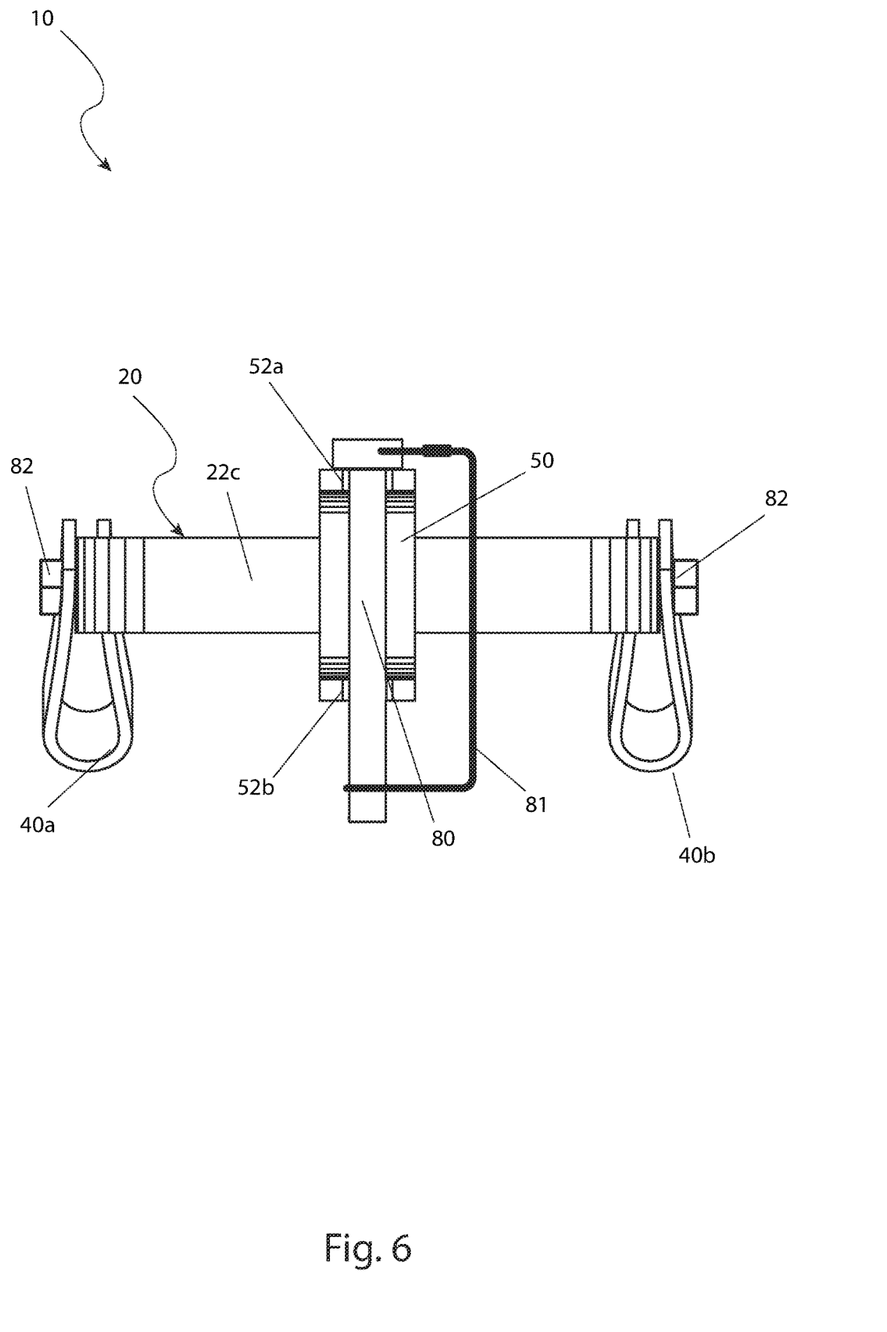
FIG. 6 is a front view of the towing frame 10, according to a preferred embodiment of the present invention.
Figure 7:
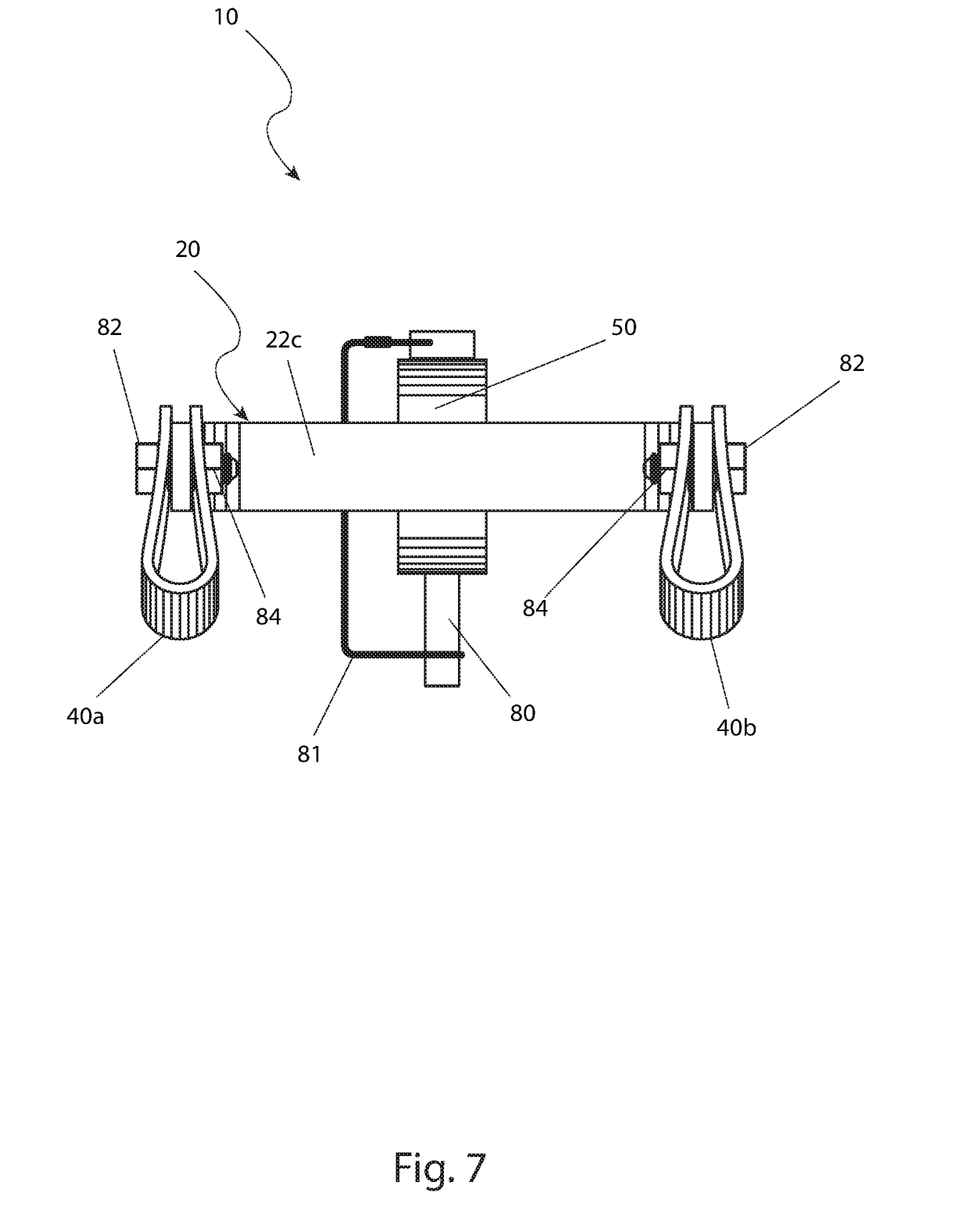
FIG. 7 is a rear view of the towing frame 10, according to a preferred embodiment of the present invention; and, FIG. 8 is a side view of the towing frame 10, according to a preferred embodiment of the present invention.
Figure 8:
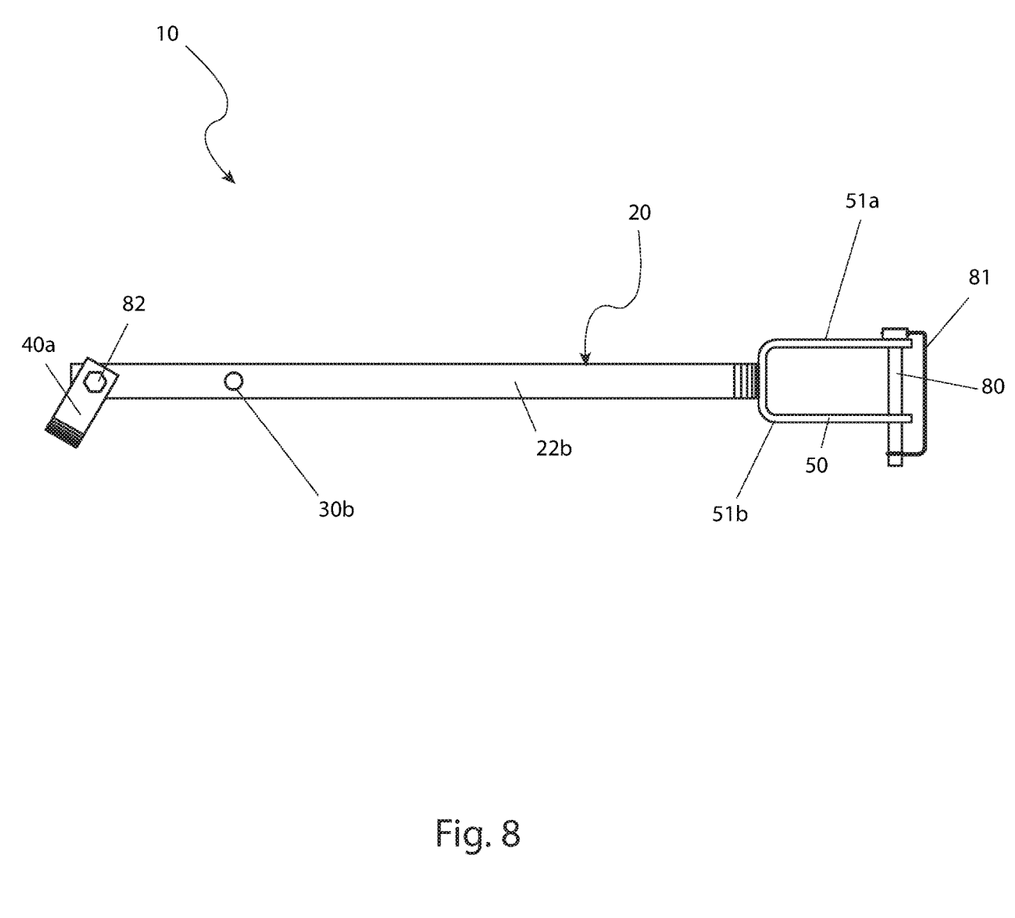

Referring now to FIGS. 2 and 3, perspective and exploded views of the apparatus 10, according to the preferred embodiment of the present invention, are disclosed. The frame 20 is preferably fabricated using formed portions of steel flat stock forming a unitary rigid weldment. The frame 20 is adapted for removable attachment to upper rear frame portions 105 and lower rear frame portions 106 of a bicycle 100, as well as to a tongue portion 155 of a towed vehicle 150 via a hitch bracket 50. The frame 20 provides a forwardly directed "U"-shaped portion having parallel first side rail 22a and a second side rail 22c portions being positioned along a horizontal plane and affixed at distal ends to a horizontal rail 22c. The side rails 22a, 22b are arranged in a linear parallel manner so as to be positioned on opposing sides of a rear wheel/tire portion 110 of the bicycle 100. The side rails 22a, 22b provide a means to establish rigid connection of the apparatus 10 at four (4) attachment points upon the bicycle 100 including attachment to opposing hub plate portions 107 of the upper rear frame 105, and to parallel lower rear frame portions 106. The aforementioned attachment means provides secure attachment of the apparatus 10 to the bicycle 100, being capable of towing a small towed vehicle 150 such as a cart, wagon, or the like, and associated cargo within.

The side rails 22a, 22b provide pairs of fastener apertures arranged in a mirror-image fashion including first hub mounting aperture 30a and second hub mounting aperture 30b portions, and first bracket mount aperture 42a and second bracket mount aperture 42b portions. The hub mounting apertures 30a, 30b provide an attachment means to existing threaded holes present within the hub plate portions 107 of the upper rear frame 105 using correspondingly sized bolt fasteners 82. The bracket mount apertures 42a, 42b are positioned forward of the hub mounting apertures 30a, 30b and provide an attachment means to the lower rear frame portions 106 of the bicycle 100 via first bracket 40a and second bracket 40b portions. The brackets 40a, 40b are affixed to the lower rear frame 106 via coincidental insertion of bolt fasteners 82 through the bracket mount apertures 42a, 42b and pairs of integral bracket fastener aperture portions 41a, 41b of each bracket 40a, 40b. The first 40a and second 40b brackets provide "U"-shaped strap-like fixtures being sized so as to wrap snuggly around and tighten upon respective parallel lower rear frame portions 106 of the bicycle 100.

The frame 20 further includes a rearwardly extending "U"-shaped hitch bracket 50 which includes rearwardly extending leg portions 51 being arranged along a vertical plane. The hitch bracket 50 is preferably mounted to a central location of the horizontal rail 22c. Each leg portion 51a, 51b includes a hitch pin aperture 52a, 52b at an end portion thereof. The hitch pin apertures 52a, 52b are aligned vertically and sized so as to receive a standard hitch pin 80 therethrough. The legs 51a, 51b are separated at a sufficient distance to allow insertion therebetween of the tongue portion 155 of the towed vehicle (see FIG. 1).

Referring now to FIGS. 4 through 8, various isometric views of the apparatus 10, according to the preferred embodiment of the present invention, are disclosed.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing the apparatus 10 onto a bicycle 100 may be achieved by performing the following steps: procuring the apparatus 10; installing the "U"-shaped tow frame 20 onto an existing bicycle 100 by inserting side rail portions 22a, 22b of the frame 20 such that they straddle a rear wheel/tire 110 portion of the towing bicycle 100; fastening the side rails 22a, 22b to hub plate portions 107 of the bicycle 100 by affixing the hub mounting aperture portions 30a, 30b of the side rails 22a, 22b to corresponding existing aperture portions of the hub plate portions 107 of the upper rear frame 105 of the bicycle 100 using bolt fasteners 82; affixing the side rails 22a, 22b to respective parallel lower rear frame portions 106 of the bicycle 100 by wrapping the first bracket 40a and second bracket 40b portions around respective lower rear frame portions 106; attaching the brackets 40a, 40b to the mount aperture portions 42a, 42b of the side rails 22a, 22b using the provided bolt fasteners 82 and corresponding nut fasteners 84; and, securing the apparatus 10 to the bicycle 100 by tightening all fasteners 82, 84. The apparatus 10 is now ready for attachment of the towed vehicle 150.

The method of utilizing the apparatus 10 to tow an existing vehicle 150 may be achieved by performing the following steps: positioning a tongue portion 155 of the towed vehicle 150 within the hitch bracket portion 50 of the frame 20; aligning an aperture portion of the tongue 155 with the hitch pin aperture portions 52a, 52b of the hitch bracket 50; inserting a standard hitch pin 80 therethrough the apertures 52a, 52b; securing the hitch pin 80 to the hitch bracket 50 using a retainer portion 81; and, transporting the towed vehicle 150 to a destination by operating the bicycle 100 in a normal manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A towing structure, comprising:
    a frame, comprising:
        a first side rail;
        a second side rail; and,
        a horizontal rail conjoining first ends of said first and second rails;
    a hitch bracket affixed to and extending outward from a center point of said horizontal rail, comprising:
        a first hitch leg having a first hitch aperture;
        a second hitch leg having a second hitch aperture, disposed parallel with said first hitch leg;
        a hitch pin; and,
        a single hitch pin retainer;
        wherein said first and second hitch apertures are aligned with each other to receive a hitch pin configured to removably attach to a towed structure; and,
        wherein said single hitch pin retainer is secured within a hitch pin first end and removably secures about a hitch pin second end thereby securing said hitch pin within said first hitch leg first aperture and second hitch leg second aperture;
    wherein said towing structure is removably attached to a bicycle hub plate and simultaneously to a bicycle lower rear frame;
    wherein said hitch bracket extends in an opposite direction than said first and second side rails;
    wherein said first and second side rails further comprise a plurality of first and second apertures, respectively, and disposed in parallel with each other;
    wherein said plurality of first and second apertures are capable of receiving a fastener to attach said towing structure to said bicycle;
    wherein said horizontal rail creates a gap between said first and second rails configured to provide clearance of a wheel of said bicycle; and,
    wherein said frame and said hitch bracket are a unitary structure.

2. A towing structure, comprising:
    a frame, comprising:
        a first side rail, comprising a plurality of first apertures;
        a second side rail, comprising a plurality of second apertures and disposed parallel with said first side rail; and,
        a horizontal rail conjoining first ends of said first and second rails;
    a first bracket, comprising a first bracket aperture;
    a second bracket, comprising a second bracket aperture; and,
    a hitch bracket affixed to and extending outward from a center point of said horizontal rail, comprising:
        a first hitch leg having a first hitch aperture;
        a second hitch leg having a second hitch aperture, disposed parallel with said first hitch leg;
        a hitch pin; and,
        a single hitch pin retainer;
        wherein said first and second hitch apertures are aligned with each other to receive a hitch pin configured to removably attach to a towed structure; and,
        wherein said single hitch pin retainer is secured within a hitch pin first end and removably secures about a hitch pin second end thereby securing said hitch pin within said first hitch leg first aperture and second hitch leg second aperture;
    wherein said towing structure is removably attached to a bicycle hub plate and simultaneously to a bicycle lower rear frame;
    wherein when one of said plurality of first apertures is aligned with said first bracket aperture, they receive a fastener to adaptably attach said towing structure to a first side of a bicycle;
    wherein when one of said plurality of second apertures is aligned with said second bracket aperture, they receive said fastener to adaptably attach said towing structure to a second side of a bicycle;
    wherein said hitch bracket extends in an opposite direction than said first and second side rails;
    wherein said horizontal rail creates a gap between said first and second rails configured to provide clearance of a wheel of said bicycle; and,
    wherein said frame and said hitch bracket are a unitary structure.

3. A towing structure, comprising:
    a frame, comprising:
        a first side rail, comprising a plurality of first apertures;
        a second side rail, comprising a plurality of second apertures and disposed parallel with said first side rail; and,
        a horizontal rail conjoining first ends of said first and second rails;
    a first bracket, comprising a first bracket aperture;
    a second bracket, comprising a second bracket aperture; and,
    a hitch bracket affixed to and extending outward from a center point of said horizontal rail, comprising:
        a first hitch leg having a first hitch aperture;
        a second hitch leg having a second hitch aperture, disposed parallel with said first hitch leg;
        a hitch pin; and,
        a single hitch pin retainer;
        wherein said first and second hitch apertures are aligned with each other to receive a hitch pin configured to removably attach to a towed structure; and,
        wherein said single hitch pin retainer is secured within a hitch pin first end and removably secures about a hitch pin second end thereby securing said hitch pin within said first hitch leg first aperture and second hitch leg second aperture;

wherein said towing structure is removably attached to a bicycle hub plate and simultaneously to a bicycle lower rear frame;
wherein when one of said plurality of first apertures is aligned with said first bracket aperture, they receive a fastener to adaptably attach said towing structure to a first side of a bicycle;
wherein when one of said plurality of second apertures is aligned with said second bracket aperture, they receive said fastener to adaptably attach said towing structure to a second side of a bicycle;
wherein said hitch bracket extends in an opposite direction than said first and second side rails;
wherein said horizontal rail creates a gap between said first and second rails configured to provide clearance of a wheel of said bicycle;
wherein said first and second hitch apertures are aligned with each other to receive a hitch pin configured to removably attach to a towed structure; and,
wherein said frame and said hitch bracket are a unitary structure.

* * * * *